United States Patent
Edgar (10) Patent No.: US 12,219,039 B2
(45) Date of Patent: Feb. 4, 2025

(54) REMOTE VEHICLE COMMUNICATIONS BITRATE DETERMINATION

(71) Applicant: REPAIRIFY, INC., Plano, TX (US)

(72) Inventor: Michael Patrick Edgar, Plano, TX (US)

(73) Assignee: Repairify, Inc., Plano, TX (US)

( * ) Notice: Subject to any disclaimer, the term of this patent is extended or adjusted under 35 U.S.C. 154(b) by 0 days.

(21) Appl. No.: 18/566,325

(22) PCT Filed: May 31, 2022

(86) PCT No.: PCT/US2022/072654
§ 371 (c)(1),
(2) Date: Dec. 1, 2023

(87) PCT Pub. No.: WO2022/256794
PCT Pub. Date: Dec. 8, 2022

(65) Prior Publication Data
US 2024/0267149 A1    Aug. 8, 2024

Related U.S. Application Data

(60) Provisional application No. 63/195,490, filed on Jun. 1, 2021.

(51) Int. Cl.
*H04L 1/00* (2006.01)
*G07C 5/00* (2006.01)
(Continued)

(52) U.S. Cl.
CPC .............. *H04L 69/24* (2013.01); *G07C 5/008* (2013.01); *H04L 1/0002* (2013.01);
(Continued)

(58) Field of Classification Search
CPC . H04L 1/0002; H04L 1/0003; H04L 12/5631; H04L 12/5632; H04L 7/0012;
(Continued)

(56) References Cited

U.S. PATENT DOCUMENTS 6,611,755 B1 *  8/2003  Coffee .................... B28C 9/00
                                                     455/526
6,735,630 B1 *  5/2004  Gelvin .................. B60R 25/33
                                                     709/200
(Continued)

FOREIGN PATENT DOCUMENTS

JP       H10-31044         2/1998
JP       2006332984 A     12/2006
(Continued)

OTHER PUBLICATIONS

Yun, Hyun-Jeong, et al., "Vehicle-generated data exchange protocol for Remote OBD inspection and maintenance", Computer Sciences and Convergence Information Technology (ICCIT), 2011 6th International Conference on, Nov. 29, 2011 IEEE—ISBN 978-1-4577-0472-7 ; ISBN 1-4577-0472-2, pp. 81-84.
(Continued)

*Primary Examiner* — James M Perez
(74) *Attorney, Agent, or Firm* — PRANGER LAW PC (57) ABSTRACT

A method of remote communications with an on-board diagnostics (OBD) system of a vehicle includes connecting a vehicle communications device to a connector of a vehicle's OBD system, connecting a remote communications device to a connector of a vehicle tool device, and establishing a network communications link between the vehicle communications device and a remote communications device. The vehicle communications device receives communications at the ve-hicle-communications device from the vehicle's OBD system through the connector. A bit stream of the received communications is analyzed over an interval of time.

22 Claims, 8 Drawing Sheets

(51) Int. Cl.
  *H04L 7/00* (2006.01)
  *H04L 25/02* (2006.01)
  *H04L 67/12* (2022.01)
  *H04L 69/24* (2022.01)
(52) U.S. Cl.
  CPC ........ *H04L 7/0012* (2013.01); *H04L 25/0262* (2013.01); *H04L 67/12* (2013.01); *G07C 2205/02* (2013.01)
(58) Field of Classification Search
  CPC . H04L 7/0007; H04L 7/0005; H04L 25/0262; H04L 25/02; H04L 25/00; H04L 25/38; H04L 25/40; H04L 25/49; H04L 25/4902; H04L 27/00; H04L 27/10; H04L 27/14; H04L 27/156; H04L 27/1563; H04L 27/1566; H04L 2012/28; H04L 2012/40; H04L 2012/40267; H04L 2012/40273; G07C 5/008; G07C 5/0816
  See application file for complete search history.

(56) References Cited

U.S. PATENT DOCUMENTS

| | | | | |
|---|---|---|---|---|
| 6,826,607 | B1* | 11/2004 | Gelvin | G01V 1/22 709/224 |
| 6,832,251 | B1* | 12/2004 | Gelvin | G01V 1/22 709/224 |
| 6,853,853 | B1* | 2/2005 | Van Wiemeersch | B60R 25/24 340/5.2 |
| 6,859,831 | B1* | 2/2005 | Gelvin | H04L 12/2805 709/224 |
| 6,892,131 | B2* | 5/2005 | Coffee | B28C 5/422 455/518 |
| 6,965,816 | B2* | 11/2005 | Walker | G08B 31/00 701/16 |
| 6,988,026 | B2* | 1/2006 | Breed | B60R 21/20 701/33.9 |
| 7,020,701 | B1* | 3/2006 | Gelvin | H04L 67/12 709/224 |
| 7,103,460 | B1* | 9/2006 | Breed | G07C 5/008 706/15 |
| 7,489,993 | B2* | 2/2009 | Coffee | G01M 17/00 180/209 |
| 7,663,502 | B2* | 2/2010 | Breed | B60N 2/0244 340/7.29 |
| 8,014,789 | B2* | 9/2011 | Breed | B60R 21/01542 455/410 |
| 8,688,313 | B2* | 4/2014 | Margol | G06F 8/61 701/31.4 |
| 8,989,950 | B2* | 3/2015 | Gilbert | G06Q 10/087 701/31.4 |
| 9,002,572 | B2* | 4/2015 | Lipscomb | G07C 5/00 702/183 |
| 9,361,738 | B2* | 6/2016 | Gilbert | G07C 5/008 |
| 9,684,500 | B2* | 6/2017 | Margol | G07C 5/008 |
| 10,528,334 | B2* | 1/2020 | Margol | G06F 8/61 |
| 10,785,063 | B2* | 9/2020 | Kim | H04L 47/25 |
| 11,062,534 | B2* | 7/2021 | Jingle | G07C 5/0808 |
| 11,539,550 | B2* | 12/2022 | Bijjala | H04L 69/18 |
| 11,823,503 | B2* | 11/2023 | Jingle | G07C 5/0808 |
| 2003/0093187 | A1* | 5/2003 | Walker | B64D 45/0059 701/1 |
| 2003/0167345 | A1* | 9/2003 | Knight | H04L 12/46 701/1 |
| 2004/0039504 | A1* | 2/2004 | Coffee | B60P 3/03 701/482 |
| 2004/0130442 | A1* | 7/2004 | Breed | G06V 20/593 340/449 |
| 2005/0046584 | A1* | 3/2005 | Breed | G06F 3/0237 340/13.31 |
| 2005/0187677 | A1* | 8/2005 | Walker | B64C 13/20 701/16 |
| 2005/0192727 | A1* | 9/2005 | Shostak | G07C 5/008 701/1 |
| 2005/0271072 | A1* | 12/2005 | Anderson | H04L 65/80 370/474 |
| 2005/0273218 | A1* | 12/2005 | Breed | G06K 7/10178 701/2 |
| 2006/0025897 | A1* | 2/2006 | Shostak | G06K 19/0717 701/1 |
| 2006/0142913 | A1* | 6/2006 | Coffee | G01M 17/00 701/29.3 |
| 2006/0208169 | A1* | 9/2006 | Breed | G01S 17/88 250/221 |
| 2007/0129878 | A1* | 6/2007 | Pepper | B60W 50/0098 701/123 |
| 2008/0064413 | A1* | 3/2008 | Breed | B60R 22/20 455/456.1 |
| 2008/0161989 | A1* | 7/2008 | Breed | B60N 2/0244 701/31.4 |
| 2009/0088924 | A1* | 4/2009 | Coffee | B28C 5/422 701/31.4 |
| 2009/0276117 | A1* | 11/2009 | Raichle | B60W 50/02 701/29.3 |
| 2010/0148940 | A1* | 6/2010 | Gelvin | H01Q 9/0464 340/286.02 |
| 2011/0106374 | A1* | 5/2011 | Margol | G07C 5/008 710/305 |
| 2011/0174066 | A1* | 7/2011 | Martin | G01M 15/09 73/114.74 |
| 2012/0209470 | A1* | 8/2012 | Gilbert | G06Q 10/087 707/769 |
| 2014/0070943 | A1* | 3/2014 | Breed | G01S 17/88 340/539.22 |
| 2014/0180531 | A1* | 6/2014 | Lipscomb | G07C 5/008 701/33.2 |
| 2014/0249696 | A1* | 9/2014 | Margol | G06F 8/61 701/2 |
| 2014/0249712 | A1* | 9/2014 | Margol | G06F 8/61 701/31.5 |
| 2015/0149028 | A1* | 5/2015 | Gilbert | G06F 16/434 701/31.5 |
| 2017/0269599 | A1* | 9/2017 | Ansari | G06T 17/00 |
| 2017/0277527 | A1* | 9/2017 | Margol | G06F 8/61 |
| 2019/0108010 | A1* | 4/2019 | Tillman | H04L 67/12 |
| 2019/0129426 | A1* | 5/2019 | Garcia | G05D 1/0088 |
| 2019/0238369 | A1* | 8/2019 | Kim | H04L 25/0262 |
| 2019/0322317 | A1* | 10/2019 | Pourrezaei Khaligh | G01P 3/04 |
| 2019/0385057 | A1* | 12/2019 | Litichever | H04L 63/14 |
| 2020/0040984 | A1* | 2/2020 | Chen | F16H 3/091 |
| 2020/0168009 | A1* | 5/2020 | Jingle | G06V 20/62 |
| 2020/0294401 | A1* | 9/2020 | Kerecsen | G08G 1/205 |
| 2021/0266193 | A1* | 8/2021 | Bijjala | H04L 12/4013 |
| 2021/0319634 | A1* | 10/2021 | Jingle | G07C 5/008 |
| 2022/0046114 | A1* | 2/2022 | Entelis | H04L 12/40 |
| 2022/0383666 | A1* | 12/2022 | Edgar | H04W 4/44 |
| 2022/0385747 | A1* | 12/2022 | Edgar | H04L 1/0002 |
| 2024/0135758 | A1* | 4/2024 | Edgar | H04L 67/5651 |
| 2024/0267149 | A1* | 8/2024 | Edgar | H04L 25/0262 |

FOREIGN PATENT DOCUMENTS

| | | |
|---|---|---|
| JP | 2017019501 A | 1/2017 |
| KR | 10-1715331 | 3/2017 |
| KR | 10-2018-0064274 | 6/2018 |
| KR | 10-2019-0091929 | 8/2019 |
| KR | 10-2021-0054387 | 5/2021 |

OTHER PUBLICATIONS

International Search Report and Written Opinion issued in PCT Application No. PCT/US2022/072654 on Aug. 17, 2022, 14 pgs.
International Preliminary Report on Patentability received for PCT Patent Application No. PCT/US2022/072654, mailed on Dec. 14, 2023, 6 pgs.

* cited by examiner

Sample Bit Stream with 5-Bit "Stuffing" Sync Protocol

FIG. 6A

Bit Pulse Times with 5-Bit "Stuffing" Sync Protocol

| Bit Rate | 1 bit | 2 bits | 3 bits | 4 bits | 5 bits |
|---|---|---|---|---|---|
| 500 kHz | 2 μs | 4 μs | 6 μs | 8 μs | 10 μs |
| 250 kHz | 4 μs | 8 μs | 12 μs | 16 μs | 20 μs |
| 125 kHz | 8 μs | 16 μs | 24 μs | 32 μs | 40 μs |
| 100 kHz | 10 μs | 20 μs | 30 μs | 40 μs | 50 μs |
| 50 kHz | 20 μs | 40 μs | 60 μs | 80 μs | 100 μs |

FIG. 6B

Possible Timer Tick Values Using 16 MHz Clock

| Bit Rate | 1 bit | 2 bits | 3 bits | 4 bits | 5 bits |
|---|---|---|---|---|---|
| 500 kHz | 32 | 64 | 96 | 128 | 160 |
| 250 kHz | 64 | 128 | 192 | 256 | 320 |
| 125 kHz | 128 | 256 | 384 | 512 | 640 |
| 100 kHz | 160 | 320 | 480 | 640 | 800 |
| 50 kHz | 320 | 640 | 960 | 1280 | 1600 |

| Detected Pulse width | Possibility 1 | Possibility 2 | Possibility 3 |
|---|---|---|---|
| 4μs | 250 kHz: | 500 kHz: | None |
| 8μs | 125 kHz: | 250 kHz: | 500 kHz: |
| 10μs | 100 kHz: | 500 kHz: | None |
| 16μs | 125 kHz: | 250 kHz: | None |
| 20μs | 250 kHz: | None | None |
| 40μs | 100 kHz: | 125 kHz: | None |

FIG. 9

REMOTE VEHICLE COMMUNICATIONS BITRATE DETERMINATION

CROSS-REFERENCE TO RELATED PATENT APPLICATION

This is a utility application based upon and claims priority of application 63/195,490 filed on Jun. 1, 2021. This related application is incorporated herein by reference and made a part of this application. If any conflict arises between the disclosures in this utility application and that in the related provisional application, the disclosure in this utility application shall govern. Moreover, the inventor(s) incorporate herein by reference any and all patents, patent applications, and other documents hard copy or electronic, cited or referred to in this application.

BACKGROUND

Field of the Disclosure

The present disclosure relates generally to methods and apparatus that perform vehicle system communications.

Description of Related Art

On-board diagnostics ("OBD") systems enable a vehicle owner or technician to access vital information about and program various modules, systems, and sub-systems within a vehicle. Manufacturers have included OBD systems in their vehicles for many years. In a traditional repair setting, a technician utilizes a specialized scan tool that is adapted to interface with a given vehicle's OBD system using the vehicle's data link connector ("DLC"). Many such OBD systems operate through a controller area network (CAN) of the vehicle, which facilitates communications between interconnected sub-systems of a vehicle. The scan tool is capable of reading data about the vehicle's modules, systems, and sub-systems for diagnostic purposes while also enabling some reprogramming of the modules, systems, and sub-systems. Typically, these scan tools are stand-alone handheld computing devices connected directly to a vehicle via a cable with a plug on one end that can plug into the vehicle's DLC.

Numerous standards have been implemented for vehicle diagnostic systems and communication protocols, some mandated for tracking and inspecting such features as emission control. These communication standards include, for example, OBD-1, OBD-II, SAE J2534, SAE J1850 PWM (pulse-width modulation), ISO 15765, and ISO 9141-2. One common standardized feature of OBD systems has become the use of a 16-pin DLC, usually located under the dashboard of the vehicle. Many vehicle manufacturers utilize this connection system and have adopted the aforementioned communication standards that are shared with the public for performing basic diagnostic and reprogramming functions.

Many manufacturers also use these same OBD systems to repair and update various advanced computerized systems within a vehicle. There are some diagnostic/programming tools which can utilize personal computers and remote networking systems. A problem with using such systems, however, is determining the protocol and other parameters for communicating with a given vehicle's OBD system, which can vary significantly across vehicles and may not be readily ascertainable from documentation. These parameters may include a communications bitrate, for example. Before facilitating remote communications with an OBD system, such as with a network communications device, the communications parameters of the OBD system must be determined.

SUMMARY

Embodiments of the present disclosure include systems and methods for implementing communications between vehicle on board diagnostics ("OBD") systems and remote scan/programming tools designed for addressing issues in such communications. A communication system includes a vehicle-(or car-)side communications device that is configured to plug into or otherwise connect to an OBD system connector (e.g., DLC) and has a network communications interface for facilitating bi-directional communication between the OBD system and remote network devices. The system also includes a tool-side (or remote) communications device that has a connector which permits a scan/programming tool to plug into the tool-side communications device as if it were the connector to a vehicle's OBD system. The tool-side device also has a network communications interface that facilitates bi-directional communications between a connected scan/programming tool and an OBD system connected to a car-side device through its respective network communications interface.

In some vehicle communications and/or vehicle tool systems, the bit-rate of the system is set or determinable by a protocol standard (e.g., utilizing OBD-II). In some systems, the bit rate of the system is not standardized or published (e.g., in some implementations of the CAN protocol). In some embodiments, where the bit rate is not known (e.g., is not standardized or published), the vehicle-side device is configured to determine a bitrate used by the OBD system (of either a vehicle-side or tool-side communications device) before providing network communications. In some embodiments, the bitrate is determined by monitoring a communication output (e.g., a signal on a connection pin) of an OBD connector of the OBD system/Tool and using an onboard computer clock of the vehicle/tool-side device that tracks elapsed time during the monitoring. The monitoring includes identifying when the state of the OBD output changes (e.g., a leading edge or falling edge of a signal) and tracking the elapsed interval between such events (e.g., pulse widths) using the onboard clock. One or more tracked elapsed intervals are analyzed to determine a corresponding communications bitrate. In some cases, a measured interval corresponds with only one of numerous possible bitrates, which is then selected for use. In some embodiments, multiple intervals are measured and analyzed to narrow the possibilities of which bitrate is used until the possibilities are narrowed to one possibility.

BRIEF DESCRIPTION OF THE DRAWINGS

Embodiments of the disclosure may be described hereafter in detail with particular reference to the drawings. Throughout this description, like elements, in whatever embodiment described, refer to common elements wherever referred to and reference by the same reference number. The characteristics, attributes, functions, interrelations ascribed to a particular element in one location apply to that element when referred to by the same reference number in another location unless specifically stated otherwise. In addition, the exact dimensions and dimensional proportions to conform to specific force, weight, strength and similar requirements will be within the skill of the art after the following description has been read and understood.

All figures are drawn for ease of explanation of the basic teachings of the present disclosure only; the extensions of the figures with respect to number, position, relationship and dimensions of the parts to form examples of the various embodiments will be explained or will be within the skill of the art after the present disclosure has been read and understood.

DETAILED DESCRIPTION OF THE INVENTION

In order that embodiments of the disclosure may be clearly understood and readily carried into effect, certain embodiments of the disclosure will now be described in further detail with reference to the accompanying drawings. The description of these embodiments is given by way of example only and not to limit the scope of the disclosure. It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Figure 1:
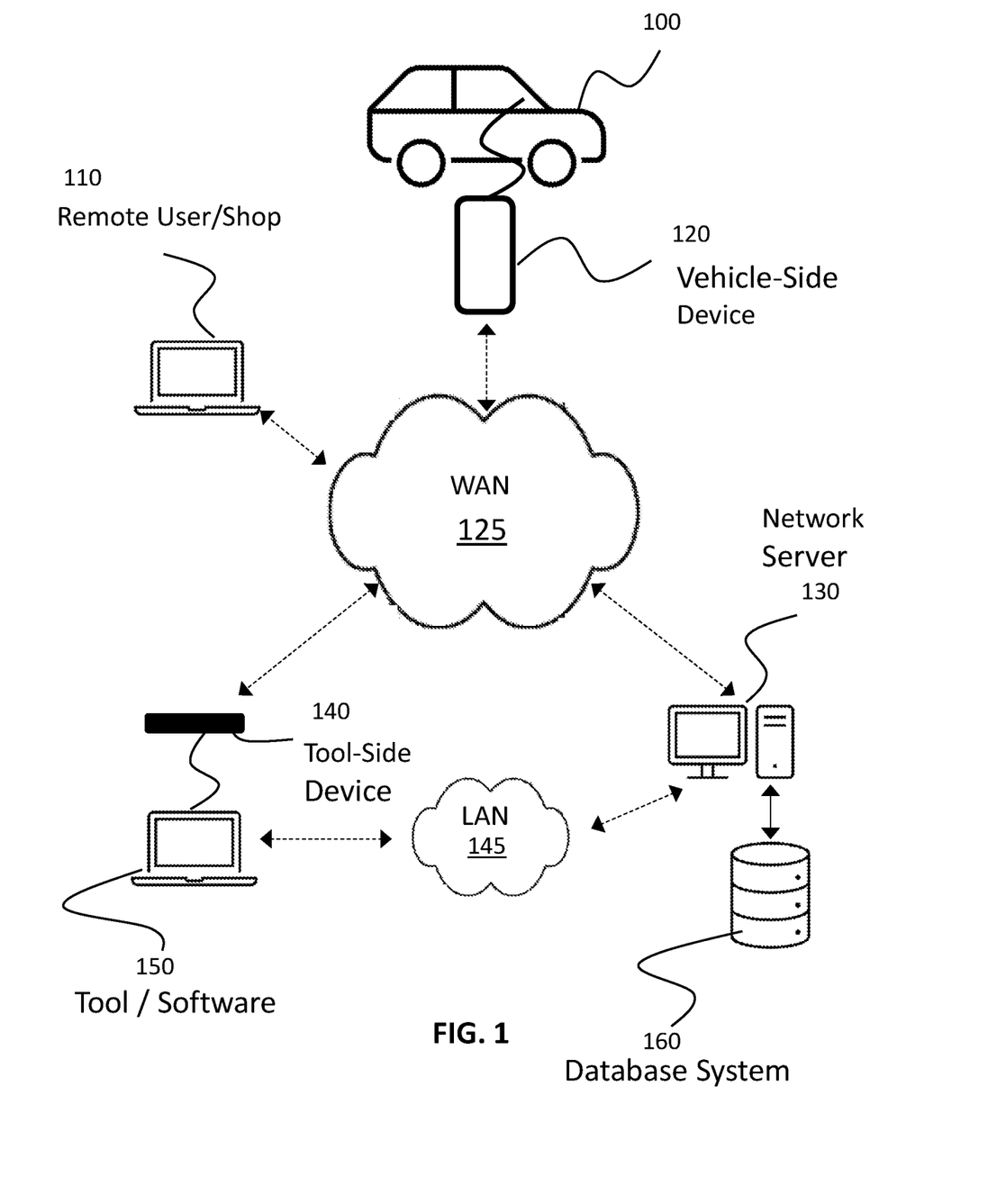
FIG. 1 is an illustrative diagram of a remote vehicle communications system according to some embodiments.

FIG. 1 is an illustrative diagram of a remote vehicle communications system according to some embodiments. A vehicle-side communications device 120 is connected to the on-board diagnostics (OBD) system of a vehicle 100. In some embodiments, the vehicle-side communications device 120 is connected through a built-in connector (e.g., 16-pin connector 215 of FIG. 2A) of vehicle 100. The vehicle-side communications device 120 may be further connected to a wide-area network (WAN) 125 (e.g., the internet) such as through a network adapter. A diagnostics/programming tool 150 (e.g., a "scan tool") is connected to a tool-side communications device 140 that is further connected to WAN 125.

Tool 150 may be a computer installed with diagnostics/programming software configured to perform diagnostics/programming on a vehicle (e.g., vehicle 100) through a vehicle's OBD system. Tool 150 may be a tool system (e.g., a networked system of computers/devices) that includes multiple tools configurable/selectable for use with multiple types of vehicles. Tool 150 may also be a dedicated (e.g., mobile/hand-held) scan tool. The device and/or software may be authorized/produced by the vehicle's manufacturer (e.g., an OEM scan tool) and designed to establish a direct/local bi-directional connection with the vehicle (e.g., directly through a built-in OBD connector). A network server 130 and an associated database system 160 may be connected through a local area network (LAN) 145 and/or WAN 125 to assist with operation/updating of tool 150, the vehicle-side communications device 120, and/or tool-side communications device 140. Database system 160 may be configured for distribution/maintenance of configurations and/or tools for performing diagnostics/programming on a wide variety of years/makes/models of vehicles and their OBD systems.

Tool-side device 140 and vehicle-side device 120 are configured to communicate with each other and thereby facilitate communications between a tool 150 and the OBD system of vehicle 100. In some embodiments, a connection between tool-side device 140 and a vehicle-side device 120 is used to simulate or mimic a direct-wired connection between vehicle 100 and tool 150. In order to communicate with the vehicle's OBD system, a tool-side device is configured to determine the communication bitrate of the OBD system such as further described herein. In some embodiments, the bitrate is determined by monitoring communications transmitted from the OBD system and analyzing the toggling of bit states of the communication signal over known time intervals.

In some embodiments, additional remote devices (e.g., remote device) may be used to operate, configure, and/or communicate with tool-side device 140, tool 150, server 170/database system 160, vehicle-side device 120, and/or vehicle 100 through WAN 125 and/or LAN 145. For example, a remote vehicle shop may use a remote user/shop device 110 to facilitate/observe a remote programming/diagnostics session between tool 150 and vehicle 100.

Figure 2A:
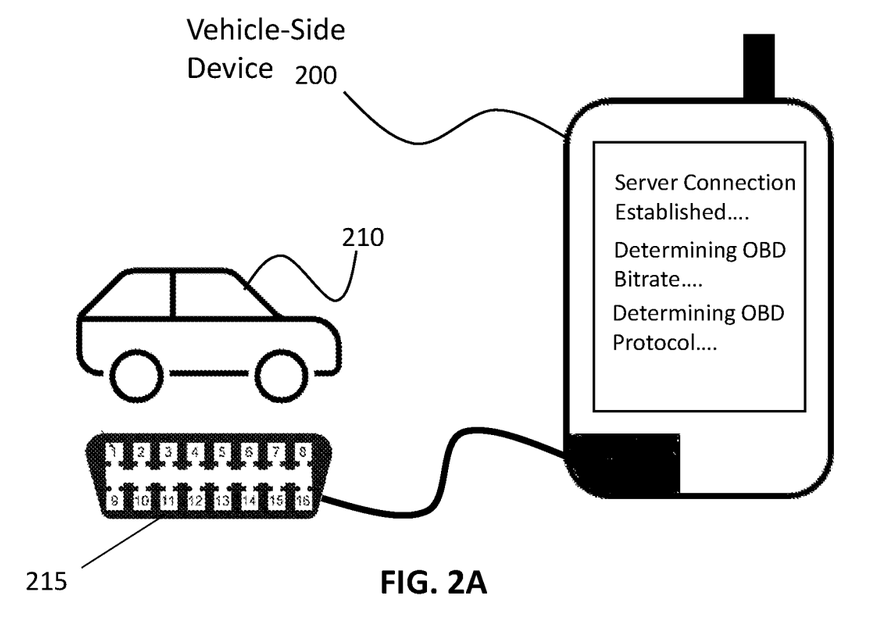
FIG. 2A is an illustrative diagram of a vehicle-side communications device according to some embodiments.

FIG. 2A is an illustrative diagram of a vehicle-side communications device according to some embodiments. Vehicle-side device 200 is configured to communicate with vehicle 210 such as through the vehicle's OBD system. Vehicle-side device may include a cable and connector 215 adapted to directly plug into a vehicle's OBD connector (e.g., a standardized 16-pin connector). The vehicle's OBD system may communicate signals through the connector by signaling different pins as "on" or "off" to reflect, for example, a 1 or 0 bit, and modulate or maintain these states at particular frequencies (or bitrates). Vehicle-side device 200 is configured to adapt to the bit-rate of the vehicle's OBD system in order to effectively read the communications from the OBD system and forward them to a tool-side device (e.g., tool-side device 140 of FIG. 1). Tool-side device 140 may also need to adapt its communications with tool 150 to reflect the bitrate used by the vehicle.

Figure 2B:
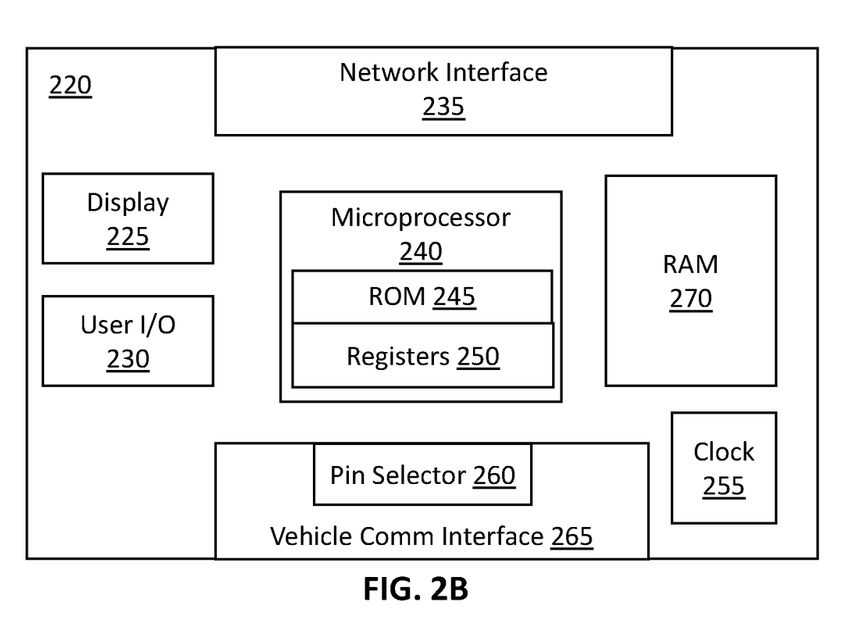
FIG. 2B is an illustrative block diagram of the components of a vehicle-side communications device according to some embodiments.

FIG. 2B is an illustrative block diagram of the computing components of a vehicle-side communications device according to some embodiments. Computing components 220 include a microprocessor 240, display 225 and input circuitry 230. Microprocessor 240 in turn includes read only memory (ROM) 245, memory registers 250, and timer circuitry or clock 255 which are used to monitor/track the timing of signal changes from connected OBD systems in order to determine their bitrates such as further described herein.

Vehicle communications interface 265 may include an OBD connection interface (e.g., for connecting through a cable and connector 215). Vehicle communications interface 265 may include a pin selector 260 which activates/deactivates communication through particular pins (e.g., 1 through 16 as shown in connector 215), which may be configured to correspond with the pins used by a particular vehicle/OBD system being communicated with. In some embodiments, the pin selector is configured based on information (e.g., a database with records of VINs and pin configurations) for connecting with the particular vehicle 210. A network interface 235 is utilized to communicate with other systems through a network (e.g., across WAN 125), including with a remote tool-side communications device (e.g., tool-side device 140) and further with a connected programming/diagnostics tool (e.g, tool 150 of FIG. 1).

A microprocessor 240 may be programmed with instructions to determine the bitrate of communications received from a vehicle OBD system such as by using hardware-driven interrupts and memory registers 250. The programming may be first loaded into RAM 270, transmitted from an external and/or internal storage device (e.g., disk drive, Cloud storage), and executed by microprocessor 240. In some embodiments, other components of device 200 and/or external connected devices (e.g., servers, network devices, storage devices and others that are not shown) may be configured to implement the features and processes described herein alone or in combination with device 200.

A computer display 225 (e.g., as shown in device 200) may be used to provide status messages about the communications process and/or other information. User input/output (I/O) 230 (e.g., mouse, keyboard) may be used by an operator to control the vehicle communications device 200 such as to initiate communications, select parameters, and/or perform/program other operations. In some embodiments, computer display 225 operates as an I/O device (e.g., a touchscreen).

Vehicle-side device is configured to convert communications from vehicle 210 into packets that can be communicated to a remote tool-side device through a network interface 235. Likewise, network interface 235 may receive packets from a tool-side communication device/tool and convert those packets into corresponding pin signals that are transmitted to the vehicle's OBD system via connector 215. In some embodiments, a tool-side communications device may be configured in similar fashion to device 200 in order to communicate with a tool.

Figure 3:
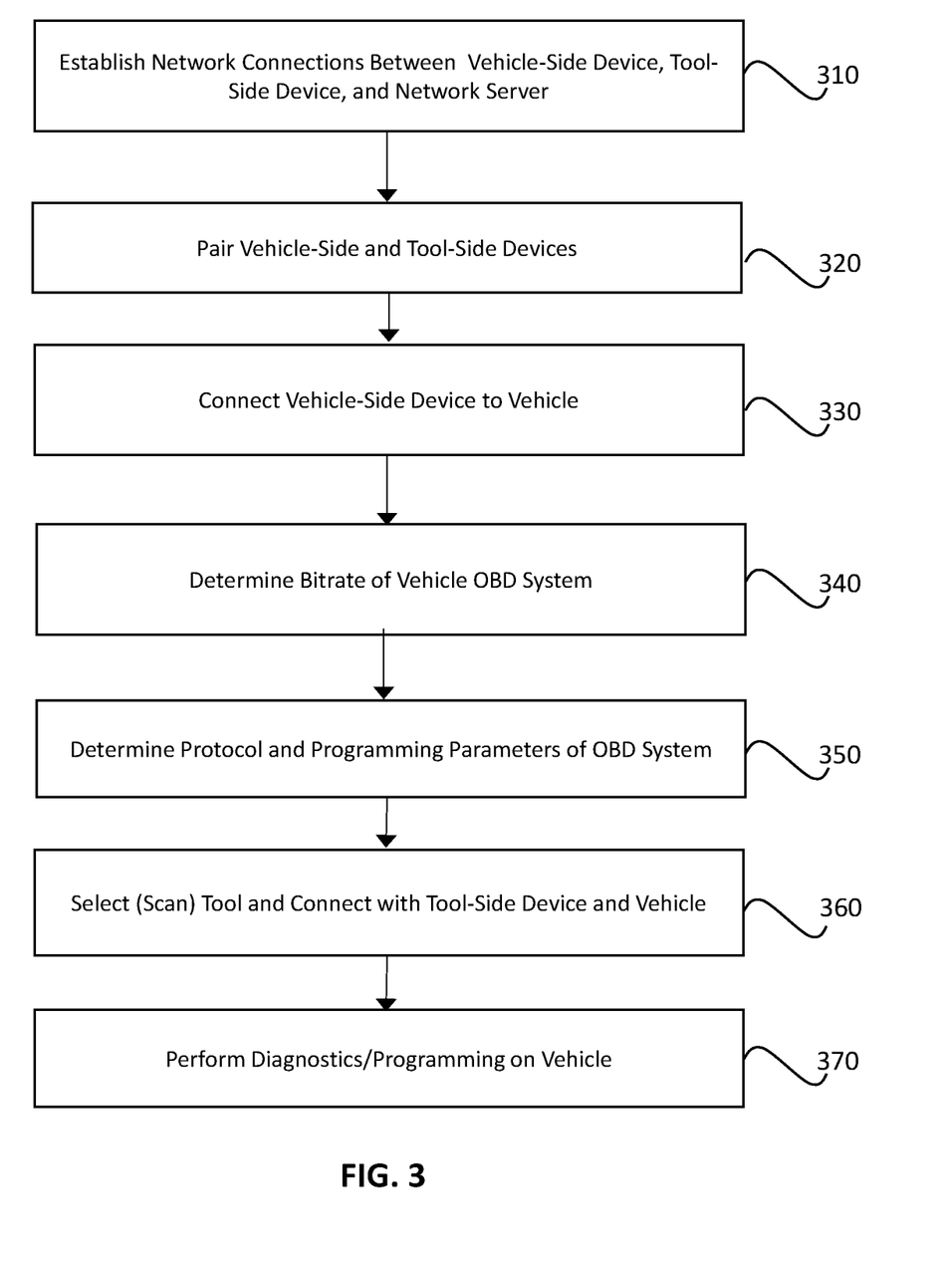
FIG. 3 is a process flow diagram for remotely communicating with an onboard vehicle diagnostics system according to some embodiments.

FIG. 3 is a process flow diagram for remotely communicating with an onboard vehicle diagnostics system according to some embodiments. At block 310, a connection is established between vehicle-side communications device(s) (e.g., device 120 of FIG. 1) and tool-side communications device (s) (e.g., device 140 of FIG. 1). A network server (e.g., server 130 of FIG. 1), for example, may assist with facilitating connections between the devices (e.g., for establishing links, parameters, etc.). In some embodiments, numerous vehicle-side and tool-side devices are connected/available through one or more networks (e.g., LAN 145 and WAN 125). At block 320, the vehicle-side and tool-side communications devices (e.g., communications devices 120 and 140) are paired with each other for facilitating a communications session (e.g., between a tool 150 and a vehicle 100). That way, for example, communications between communications devices not intended for each other can be ignored/dismissed.

At block 330, a vehicle-side communications device is connected with a vehicle in order to perform communications between the vehicle and tool via tool-side and vehicle-side communications devices. The connection may be through a vehicle OBD pin connector, for example, and a cable extending between the connector and a vehicle-side communications device.

For some vehicle diagnostics systems, the communications bit rate of a vehicle or tool is not published or standardized (e.g., as many that operate under the general CAN Protocol). In some embodiments, performing scans/programming with a particular tool commences by first determining the bit rate of the vehicle diagnostics system and/or tool. In some vehicle diagnostics systems, the bitrate of a vehicle OBD/CAN system or tool is standardized or published such as with those compliant with certain standardized protocols (e.g., in compliance with the OBD-II standard).

At block 340, the bitrate of the vehicle OBD system and/or tool is determined so that the vehicle-side or tool-side communications device can communicate with the vehicle and/or tool. In some embodiments, information about the vehicle (e.g., VIN number, make/model/manual entry) is utilized to configure a vehicle-side device/tool-side device to use the proper bitrates, protocol parameters, and/or tools for communicating with the vehicle. In such instances, some embodiments proceed without independently determining the bitrate by monitoring/analyzing bit-streams such as further described herein. In some embodiments, the bitrate used by the vehicle OBD system cannot be determined without obtaining additional information about the OBD system.

Figure 5:
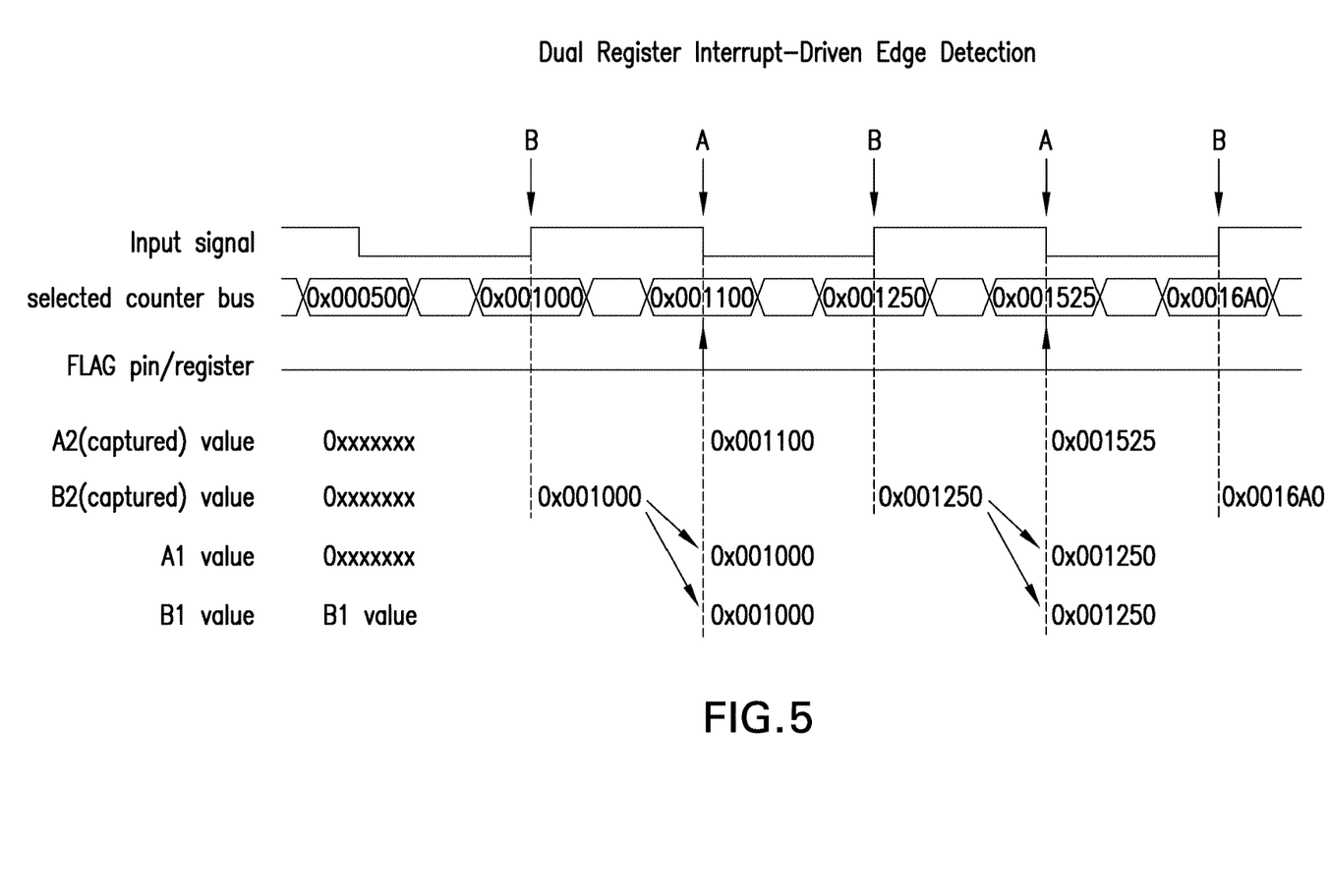
FIG. 5 is an illustrative chart of signals and device registers used for determining the bitrate of a communications device according to some embodiments.

In some embodiments, the bitrate of the vehicle OBD system or tool is determined by monitoring communications from the vehicle OBD system or tool. The vehicle-side or tool-side device may be configured with a built-in timer and registers (e.g., timer 255 and registers 250 of FIG. 2B) in which changes in the states (e.g., bit states of the pins) of communications from the OBD system trigger the communications device to record the timing of the changes (e.g., falling or rising) in the registers (e.g., as shown in FIG. 5). The recorded timing differences of the changing states are then analyzed to identify the bit-rate of OBD communications from the vehicle. In some embodiments, information about the protocol used by the vehicle or tool (e.g., a bit-stuffing protocol) is used to determine the bitrate as further described herein.

At block 350, the protocol and programming parameters of the OBD system are determined to facilitate communications using the identified bitrate. The protocol and parameters may be determined based on known information about the vehicle (e.g., VIN number, make/model/manual entry) or based on communications monitored from the OBD system/tool using the identified bitrate. For example, monitoring and parsing certain communications from the vehicle/tool may be indicators of certain protocols.

At block 360, if not already selected, a tool-side device (e.g., diagnostics scan tool, vehicle programming tool) is selected for performing diagnostics and/or programming on the vehicle through the communications link between the tool-side communications device and the vehicle-side communications device. The tool may be selected (or configured) based on the determined bitrate and/or programming/protocol parameters so as to be compatible with the vehicle OBD system.

At block 370, using the determined bitrate between the vehicle-side device and vehicle and using the selected tool, diagnostics and/or programming are performed via the communications link between the tool-side communications device and vehicle-side communications device. In some embodiments, the bitrate between the tool-side device and tool is configured to be the same as that used between the vehicle-side device and vehicle (or vice versa) so as to mimic a direct communication between the tool and vehicle.

Figure 4:
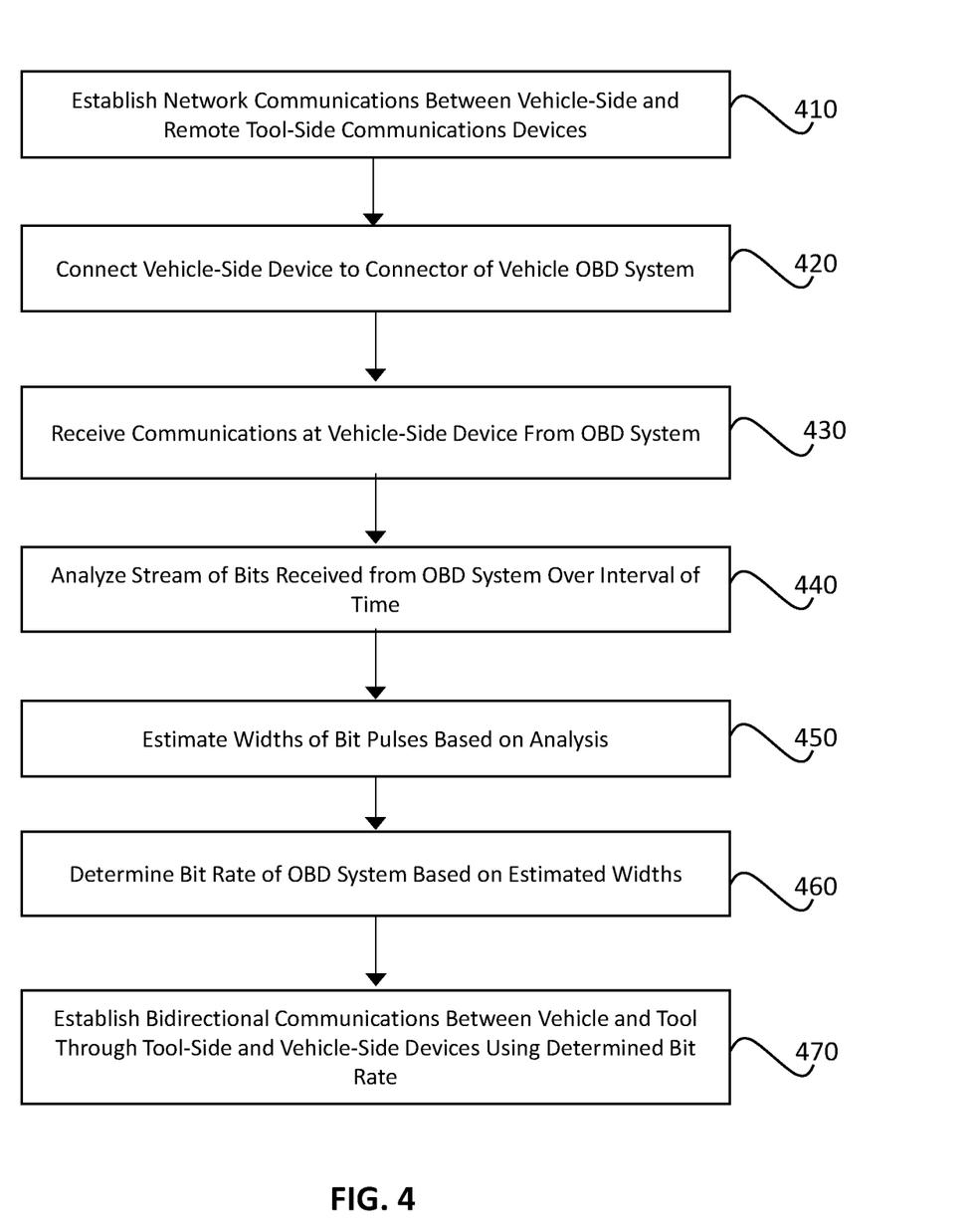
FIG. 4 is a process flow diagram for remotely communicating with an onboard vehicle diagnostics system according to some embodiments.

FIG. 4 is a process flow diagram for remotely communicating with an onboard vehicle diagnostics system according to some embodiments. At block 410, network communications are established between a vehicle-side communications device and a tool-side communications device. The tool-side device (and/or a network server) may be configured to identify/authenticate the vehicle-side device by a unique identifier (e.g., a hard-coded identifier in ROM of the vehicle-side communications device).

At block 420, a vehicle-side and/or tool-side communications device is connected to the connector of a vehicle OBD system (e.g., a 16-pin connector 215 of FIG. 2A). In some embodiments, the vehicle-side communications device has a connector (e.g., 16-pin connector) compatible with that of the vehicle's OBD connector. Prior to forwarding communications to a remote tool, the vehicle-side communications device is used to determine/confirm the bitrate of the vehicle's OBD system.

At block 430, the vehicle-side or tool-side communications device monitors communications transmitted from the OBD connector in a "listening mode." In some embodiments, the communications received from a vehicle by a vehicle communications device during the listening mode are not forwarded to a tool-side communications device. For example, because the bitrate of the vehicle may not have been determined, these communications may not be properly transferred.

At block 440, the bits received from the vehicle during the listening mode are analyzed in order to calculate/determine the bitrate used by the vehicle's OBD/CAN system. These bits may be analyzed by monitoring the state (e.g., high or low) of an output channel (e.g., pin of a pin connector) of the vehicle. In some embodiments, a timing circuit (e.g., clock/circuit 255 of FIG. 2B) of the vehicle-side communications device operates to increment clock cycles (e.g., each increment representing a number of nanoseconds) during the listening mode. In some embodiments, the vehicle/tool-side communications device is configured to be triggered (e.g., by hardware-driven interrupts) to record the clock count by the timing circuit when the signal state of a pin toggles (i.e., from low to high or high to low).

At block 450, the widths of signal pulses are estimated based on analyzing the timing of the bit state changes. For example, FIG. 5 shows an illustrative chart of signals and device registers used for determining the bitrate of a communications device according to some embodiments. An "A" register is used to record a first change in pin state (e.g., high to low or low to high) while a "B" register is used to record the next change of pin state. In some embodiments, an interrupt handler is responsible for reading the values from the registers and calculating the difference between them to determine the width of a pulse in timer ticks (and thereby total time). Multiple pulse widths for multiple signals may be calculated.

Referring again to FIG. 4, at block 460, based on the width(s) of bit pulse(s) estimated at block 450, the bitrate of the OBD system is determined. In some embodiments, after a number of pulse widths are measured, certain bitrates are eliminated as possibilities to the point where a single possible bitrate is identified. For example, if a pulse width of two microseconds is detected among the possibilities of FIGS. 6B and 7, the only remaining possibility is a bitrate of 500 KHz.

In some embodiments, information about the standards or boundary conditions used by the vehicle OBD/tool system (e.g., a bit-stuffing protocol) are used to determine or accelerate determination of the bitrate of the OBD system. For example, if a particular vehicle make and model are known to use only a subset of possible bitrates, this information may be used to narrow the possibilities of bitrates with the recorded pulse widths.

Figure 6A:
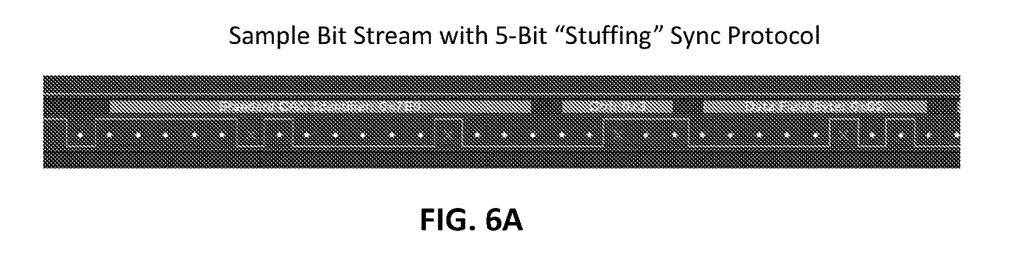
FIG. 6A shows an illustrative bit stream using a 5-bit stuffing protocol.

Referring to FIG. 6A, for example, an OBD/tool system may be known to use a particular synchronization protocol regardless of bitrate. In some OBD systems, to maintain synchronization between two controllers, for example, a bit stuffing protocol is used that sets a maximum consecutive/successive number (e.g., five) of bits of the same polarity. As shown in FIG. 6A, after 5 consecutive bits of the same polarity, an opposite polarity bit is inserted. This bit is inserted by the sending controller and removed in the receiving controller and is not part of the data being transmitted. FIG. 6A illustrates a stream of bits showing the logic-level bit stream having the stuffed bits shown as "X". While bit stuffing is designed for synchronization, some embodiments utilize the maximum number of consecutive bits to accelerate determination of the bit rate.

Figure 6B:
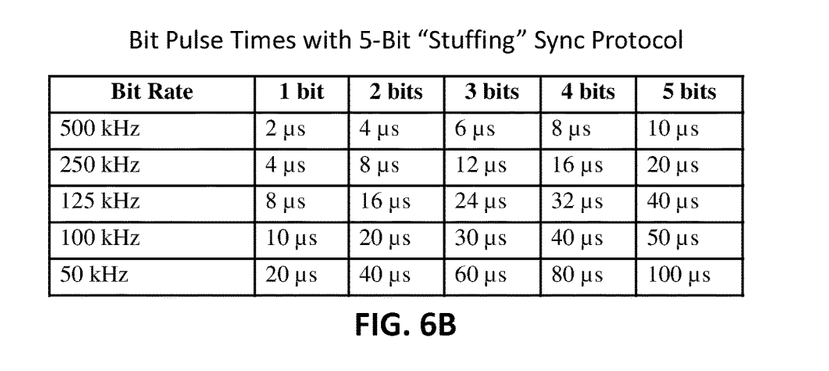
FIG. 6B is a table of bit-rates and the number of respective bits transmitted during a particular time period.
Figure 7:
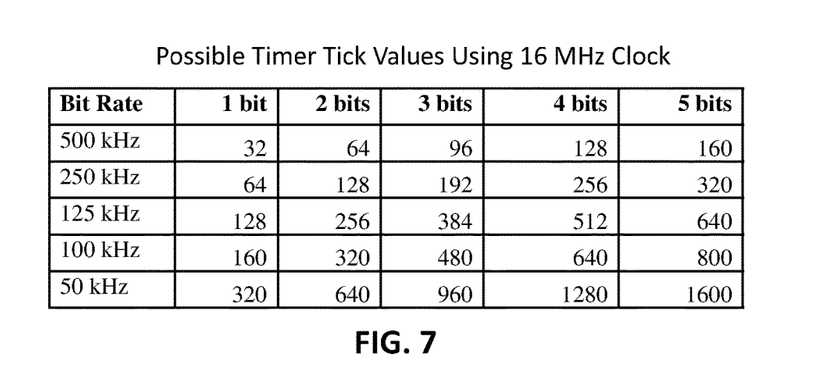
FIG. 7 is a table of timer increments for particular numbers of bits and bitrates according to some embodiments.

FIG. 6B is a table of bitrates and the number of respective bits transmitted during a particular time period. In an embodiment, a select number of possible bit rates are possible for a given OBD system that utilizes a 5-bit stuffing protocol. The table of FIG. 6B indicates the time interval for particular numbers of bits to be transmitted for each given possible bit rate while FIG. 7 indicates the corresponding clock cycles using with a 16 MHz clock.

At block 470, using the bitrate determined at block 460, bidirectional communications are established between the vehicle and a tool through the vehicle-side communications device and the remote tool-side communications device. In some embodiments, the selected bitrate is confirmed such as by monitoring the communications utilizing the selected bitrate and determining that errors do not repeatedly arise indicative of an incorrect bitrate.

Figure 8:
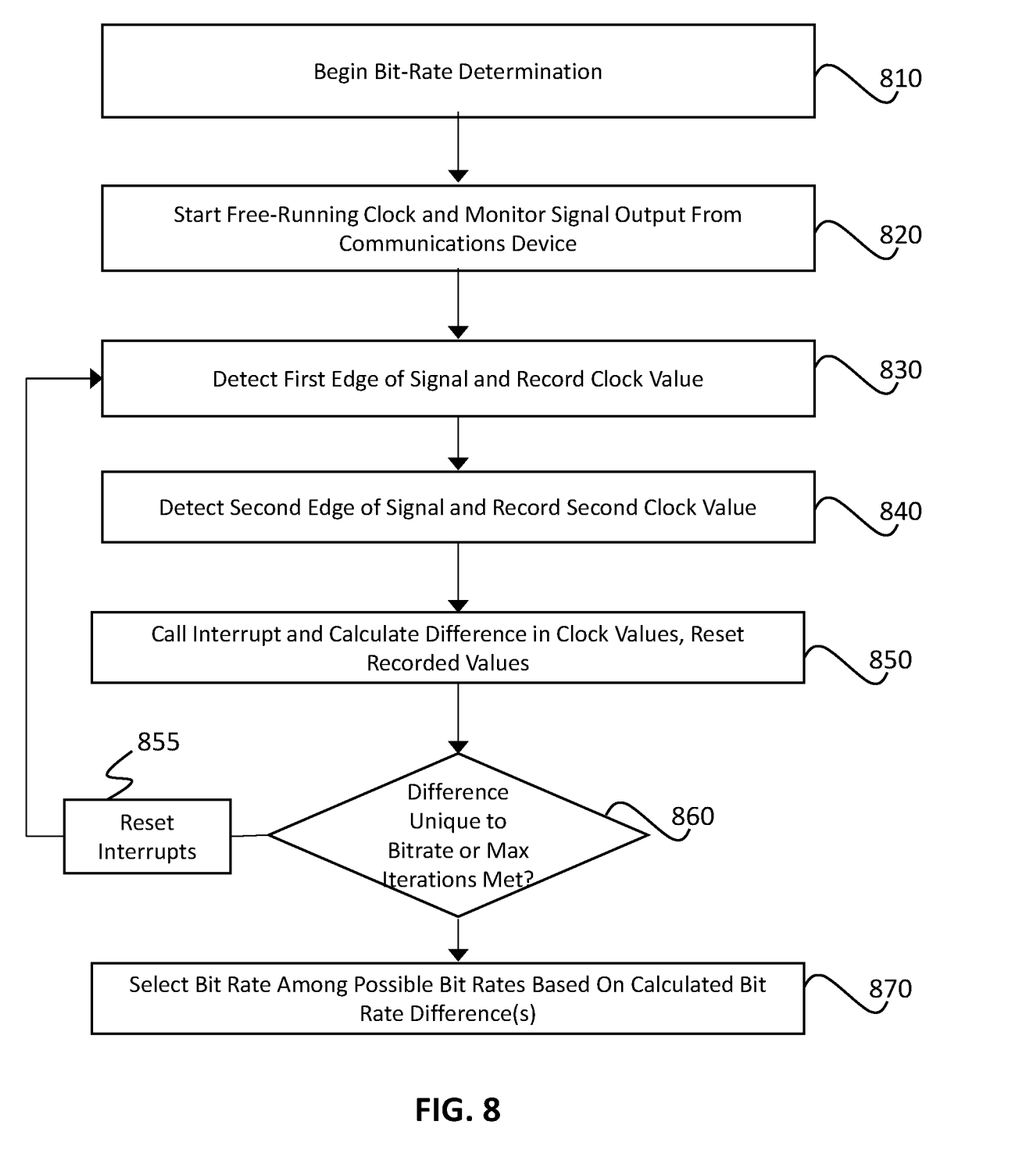
FIG. 8 is a process flow diagram for selecting a bit rate among possible bitrates of an onboard vehicle diagnostics system according to some embodiments.

FIG. 8 is a process flow diagram for selecting a bit rate among possible bit rates of an onboard vehicle diagnostics system according to some embodiments. At block 810, the process for determining the bitrate of a vehicle OBD (or a tool) system begins after a vehicle-communications device is connected to the OBD system (or a tool-side communications device is connected to a tool). The vehicle-communications device is configured to monitor changes in the states of bit signals (e.g., from an OBD connector). At block 820, a free-running clock (e.g., clock 255 of FIG. 2B) is started which cycles ("ticks") at a known frequency (e.g., 16 MHz). In some embodiments, the speed/frequency of the clock used/selected is based on the greatest possible bit rate expected of the on-board diagnostics system. In some embodiments, the clock frequency is adjusted/selected to be at least about twice that of the greatest possible bit rate expected of the vehicle OBD system. For example, where the greatest expected frequency of the vehicle OBD system is 500 KHz, the clock speed/frequency should be at least about 1 MHz, and a 4 MHz clock may be utilized for bit rate determination rather than a 16 MHz clock. One of ordinary skill in the art will recognize that there are a variety of ways to determine and adjust to a variety of clock speeds/frequencies.

At block 830, using the monitoring of changes in bitstates, a first (falling/rising) edge of the bit stream signal is detected. When the edge is detected, the number of clock cycles is recorded in computer memory. In some embodiments, an interrupt-driven process records the tick count of the clock in a memory register when a falling or rising edge of a bit-stream signal is detected (e.g., as illustrated in FIG. 5). At block 840, a second edge of a pair of edges of the bit-stream signal is detected and the number of clock cycles associated with the second edge is recorded in memory.

At block 850, after the second edge is recorded in response to an interrupt, the difference in recorded clock counts is calculated and the width of the pulse representing one or more bits is estimated based on the clock frequency. In some embodiments, various factors may impact the precision of the calculated pulse widths including, for example bus capacitance, clock differences between controllers, and alignment of the pulses with clock transitions of the OBD system.

In some embodiments, a tolerance (e.g., +5% tolerance) is utilized when estimating pulse widths and the widths may be adjusted based on their proximity to expected possible pulse widths. In some embodiments, when an estimated width is ambiguous with respect to multiple possible widths, this ambiguity is factored into the calculation/estimation made at block 860. For example, if a possible detected pulse width could be either 8 microseconds or 10 microseconds based on tolerances, this ambiguity can be factored into eliminating/narrowing possible bitrates.

Figure 9:
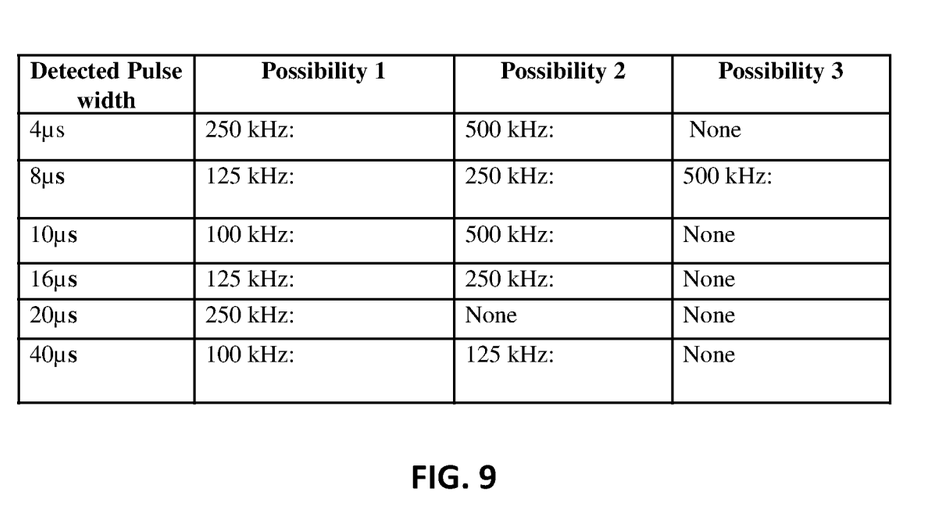
FIG. 9 is a table of possible pulse widths for selected bitrates of an onboard vehicle diagnostics system according to some embodiments.

At block 860, the determined widths of one or more pulses is analyzed to determine whether the widths are correlated with a single possible bitrate or a subset of possible bitrates. For example, FIG. 9 shows an exemplary table of detected pulse widths and corresponding possible bitrates. In some embodiments, the selection of possible bitrates is based on information about the vehicle or more broadly on bitrates used generally within the automobile industry and/or manufacturer.

In some embodiments, edge detection is performed by a process (e.g., of a multi-process program) that polls/monitors the output of a pin signal. When the bit signal state changes, the number of clock counts of a clock is recorded (e.g., in a memory register) by the process. After an initial state change (e.g., the first edge) is detected, the process continues monitoring for an additional state change. After the second state change is detected, the value of clock counts is recorded, and an interrupt is called for calculating/estimating the respective pulse width and determining if the bit rate can be determined at block 860. In some embodiments, a circuit (e.g., edge-triggered S-R circuit) can be configured to receive an input signal (i.e., from the OBD system) and trigger an output (i.e., a trigger/clock count) when a rising or falling edge occurs over the signal.

After each of the possible bitrates has been eliminated as a possibility, the process is finished and the bitrate is selected at block 870. For example, if two of the three possible bitrates of FIG. 9 are eliminated, the remaining bitrate is selected. In some embodiments, if multiple possible bitrates correlate with the determined pulse width(s), the process continues by resetting the routine at block 855 of recording first and second edges and calculating additional pulse width(s) beginning at block 830. This cycle may continue until each of the possible bitrates is eliminated and a single possible bitrate remains and is selected. In some embodiments, the process may "time-out"/abort if a maximum number of iterations occurs and a single bitrate has not been determined.

In some embodiments, if each possible bitrate other than one cannot be readily eliminated based on the estimated pulse widths after a particular number of pulses are recorded, the process may perform additional analysis after that particular number of pulses occurs. For example, the process may factor in a bit-stuffing protocol to further eliminate various possibilities. In an embodiment, recorded pulse widths that correlate directly with particular bitrates are compared to the presence of recorded pulse widths that exceed certain widths compliant with the bit-stuffing protocol for that particular bitrate but would not comply with another possible bitrate, thereby further eliminating one or more possible bitrates. This process may continue (of analyzing sequences of predetermined number of pulses/pulse widths) until all but one possible bitrate is eliminated.

The processes described herein (e.g., the processes of FIGS. 3, 4, and 8) are not limited to use with the hardware shown and described herein. They may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The processing blocks (for example, in the processes of FIGS. 3, 4, and 8) associated with implementing the system may be performed by one or more programmable processors executing one or more computer programs to perform the functions of the system. All or part of the system may be implemented using electronic hardware circuitry that include electronic devices such as, for example, at least one of a processor, a memory, a programmable logic device, and/or a logic gate. All or part of the system may be implemented as special purpose logic circuitry (e.g., an FPGA (field-programmable gate array) and/or an ASIC (application-specific integrated circuit)).

The processes described herein are not limited to the specific examples described. For example, the process of FIGS. 3, 4, and 8 are not limited to the specific processing orders illustrated. Rather, any of the processing blocks may be re-ordered, combined or removed, performed in parallel or in serial, as necessary, to achieve the results set forth above.

Elements of different embodiments described herein may be combined to form other embodiments not specifically set forth above. Various elements, which are described in the context of a single embodiment, may also be provided separately or in any suitable sub-combination. Other embodiments not specifically described herein are also within the scope of the following claims.

I claim:

1. A method of remote communications with an on-board diagnostics (OBD) system of a vehicle, the method comprising:

connecting a vehicle communications device to a connector of a vehicle's OBD system;
connecting a remote tool side communications device to a connector of a vehicle tool device;
establishing a network communications link between the vehicle-communications device and a remote communications device;
receiving communications at the vehicle side communications device or tool side communications device from the respectively connected vehicle's OBD system or tool device through the respective connector of the OBD system or tool device;
analyzing a bit stream of the received communications over an interval of time;
estimating widths of one or more bit pulses based on the analyzing of the bit stream;
determining a bit rate of the OBD system based on the estimated widths of the one or more bit pulses;
based on the determined bit rate of the OBD system, establishing bidirectional communications between the OBD system and the tool device using the established network communications link between the vehicle-communications device and the remote communications device.

2. The method of claim 1 wherein analyzing the bit stream comprises calculating time differences between one or more pairs of leading and falling edges of a signal of the bit stream and wherein determining the bit rate comprises selecting one of a plurality of possible bit rates based on the calculated time differences.

3. The method of claim 2 wherein the determining is based on a predetermined synchronization protocol of the OBD system.

4. The method of claim 3 wherein the synchronization protocol comprises a bit-stuffing protocol wherein at least one polarity change is inserted in the signal after five successive bits of the same polarity in the received communications from the OBD system.

5. The method of claim 2 wherein the calculated time differences comprise time differences between a plurality of pairs of leading and falling edges and wherein the analyzing comprises comparing the time differences to possible total transmission times of a plurality of possible successive bits of the same polarity.

6. The method of claim 5 wherein each of the time differences is correlated with one or more possible bit rates and wherein the bit rate of the OBD system is determined based on correlating a combination of the time differences with a single possible bit rate.

7. The method of claim 5 wherein each the time differences are correlated with one or more possible bit rates and wherein the bit rate of the OBD system is determined based on correlating a combination of the time differences with a most probable of a plurality of bit rates.

8. The method of claim 2 wherein the calculating of time differences between one or more pairs of leading and falling edges of a signal of the bit stream is iterated until a bit rate of the OBD system is determined or a maximum number of iterations occurs.

9. The method of claim 2 wherein the plurality of possible bit rates comprises one or more of 50 KHz, 100 KHz, 125 KHz, 250 KHz, or 500 KHz.

10. The method of claim 1 wherein analyzing the bit stream of the received communications over an interval of time comprises operating an on-board clock of the vehicle communications device to count clock cycles to estimate the widths of the one or more bit pulses.

11. The method of claim 1 wherein the establishing of bi-directional communications comprises:
communicating from the vehicle communications device through the connector of the vehicle OBD system using the determined bit rate; and
communicating from the remote communications device through the connector of the vehicle tool device using the determined bit rate.

12. A system for on board diagnostic (OBD) vehicle communications, the system comprising:
a vehicle side communications device comprising a first pin-connector adapted for connecting to a vehicle's OBD system and a first network interface configured to perform network communications;
a remote tool side communications device comprising a second pin-connector adapted for connecting to a vehicle tool device and a second network interface configured to perform network communications with the vehicle side communications device;
wherein at least one of the vehicle side communications device or tool side communications device further comprises one or more processors programmed and configured to cause the respective vehicle side or tool side communications device to perform:
receiving communications at the respective vehicle side or tool side communications device from the respective vehicle's OBD system or vehicle tool device through the respective first or second pin-connector;
analyzing a bit stream of the received communications over an interval of time;
estimating widths of one or more bit pulses based on the analyzing of the bit stream;
determining a bit rate of the OBD system based on the estimated widths of the one or more bit pulses;
based on the determined bit rate of the OBD system, establishing bidirectional communications between the OBD system and a vehicle tool device using a network communications link between the vehicle side communications device and the remote tool side communications device.

13. The system of claim 12 wherein analyzing the bit stream comprises calculating time differences between one or more pairs of leading and falling edges of a signal of the bit stream and wherein determining the bit rate comprises selecting one of a plurality of possible bit rates based on the calculated time differences.

14. The system of claim 13 wherein the determining is based on a predetermined synchronization protocol of the OBD system.

15. The system of claim 14 wherein the synchronization protocol comprises a bit-stuffing protocol wherein at least one polarity change is inserted in the signal after five successive bits of the same polarity in the received communications from the OBD system.

16. The system of claim 13 wherein the calculated time differences comprise time differences between a plurality of pairs of leading and falling edges and wherein the analyzing comprises comparing the time differences to possible total transmission times of a plurality of possible successive bits of the same polarity.

17. The system of claim 13 wherein each the time differences is correlated with one or more possible bit rates and wherein the bit rate of the OBD system is determined based on correlating a combination of the time differences with a single possible bit rate.

18. The system of claim 17 wherein each the time differences is correlated with one or more possible bit rates and wherein the bit rate of the OBD system is determined based on correlating a combination of the time differences with a most probable of a plurality of bit rates.

19. The system of claim 13 wherein the calculating of time differences between one or more pairs of leading and falling edges of a signal of the bit stream is iterated until a bit rate of the OBD system is determined or a maximum number of iterations occurs.

20. The system of claim 13 wherein the plurality of possible bit rates comprises one or more of 50 KHz, 100 KHz, 125 KHz, 250 KHz, or 500 KHz.

21. The system of claim 12 wherein the vehicle communications device comprises an on-board clock and wherein analyzing the bit stream of the received communications over an interval of time comprises operating the on-board clock to count clock cycles to estimate the widths of the one or more bit pulses.

22. The system of claim 12 wherein the establishing of bi-directional communications comprises:
- communicating from the vehicle communications device through the connector of the vehicle OBD system using the determined bit rate; and
- communicating from the remote communications device through the connector of the vehicle tool device using the determined bit rate.

* * * * *